United States Patent
Sano

(10) Patent No.: US 10,877,719 B2
(45) Date of Patent: Dec. 29, 2020

(54) AUDIO DEVICE, AUDIO SYSTEM

(71) Applicant: CLARION CO., LTD., Saitama (JP)

(72) Inventor: Katsumi Sano, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/310,357

(22) PCT Filed: Jun. 27, 2017

(86) PCT No.: PCT/JP2017/023579
§ 371 (c)(1),
(2) Date: Dec. 14, 2018

(87) PCT Pub. No.: WO2018/003797
PCT Pub. Date: Jan. 4, 2018

(65) Prior Publication Data
US 2019/0369950 A1  Dec. 5, 2019

(30) Foreign Application Priority Data
Jun. 29, 2016  (JP) .................................. 2016-128507

(51) Int. Cl.
*G06F 3/0481*  (2013.01)
*G06F 3/16*  (2006.01)
*G06F 3/14*  (2006.01)

(52) U.S. Cl.
CPC ............ *G06F 3/165* (2013.01); *G06F 3/0481* (2013.01); *G06F 3/14* (2013.01)

(58) Field of Classification Search
CPC ........... G06F 3/165; G06F 3/0481; G06F 3/14
See application file for complete search history.

(56) References Cited

U.S. PATENT DOCUMENTS

2009/0003620 A1* 1/2009 McKillop .............. G06F 3/165
 381/80
2013/0274998 A1* 10/2013 Kato ..................... B60K 37/06
 701/36

(Continued)

FOREIGN PATENT DOCUMENTS

JP 2012-208891 A 10/2012
JP 2014-38188 A 2/2014

(Continued)

OTHER PUBLICATIONS

Yano et al., "Automotive System Technologies for Enviroment, Safety, and Information, Car Information System for Added Value in Connected Cars," Hitachi Hyoron, Nov. 1, 2013, vol. 95, No. 11, pp. 68-71, with corresponding English translation, Hitachi Review vol. 63, No. 2, 2014, pp. 73-77.

(Continued)

*Primary Examiner* — Shen Shiau
(74) *Attorney, Agent, or Firm* — Lewis Roca Rothgerber Christie LLP

(57) ABSTRACT

An audio device comprises a display unit which displays information, a screen information storage unit which stores screen information of a predetermined application, an acceptance unit which accepts a selection of an application, a selection information storage unit which stores selection information of the application accepted by the acceptance unit, an audio device communication unit which sends the application selection information to the portable terminal and receives information according to the application selection information, and a screen display control unit which, upon receiving information according to the application selection information from the audio device communication unit, displays on the display unit a screen using the screen information stored in the screen information storage unit (Continued)

based on the application selection information stored in the selection information storage unit.

8 Claims, 7 Drawing Sheets

(56) References Cited

U.S. PATENT DOCUMENTS

| | | | | |
|---|---|---|---|---|
| 2013/0298052 A1* | 11/2013 | Nara | ................ | G01C 21/3629 715/764 |
| 2013/0305262 A1* | 11/2013 | Nara | ................ | H04M 1/6091 719/320 |
| 2015/0062043 A1* | 3/2015 | Kim | ................ | G06F 3/04883 345/173 |
| 2016/0124882 A1* | 5/2016 | Suetsugu | ............ | G06F 9/4413 710/14 |
| 2017/0160877 A1 | 6/2017 | Maeda et al. | | |

FOREIGN PATENT DOCUMENTS

| | | | | |
|---|---|---|---|---|
| JP | 2015-216586 A | | 12/2015 | |
| JP | 2015-220533 A | | 12/2015 | |
| JP | 2016-21124 A | | 2/2016 | |
| JP | WO 2016009593 | * | 2/2016 | ........... G06F 3/0481 |
| JP | 2016-85710 A | | 5/2016 | |

OTHER PUBLICATIONS

Japanese Office Action dated Jun. 23, 2020 regarding Japanese Patent Application No. 2016-128507 corresponding to U.S. Appl. No. 16/310,357 (3 pages) with English Translation (3 pages).

* cited by examiner

FIG.3
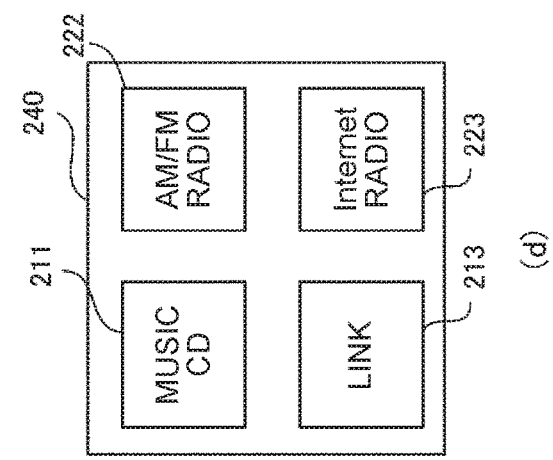
(b)
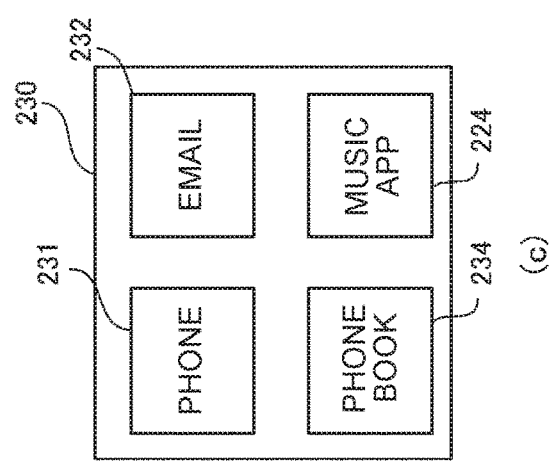
(d)
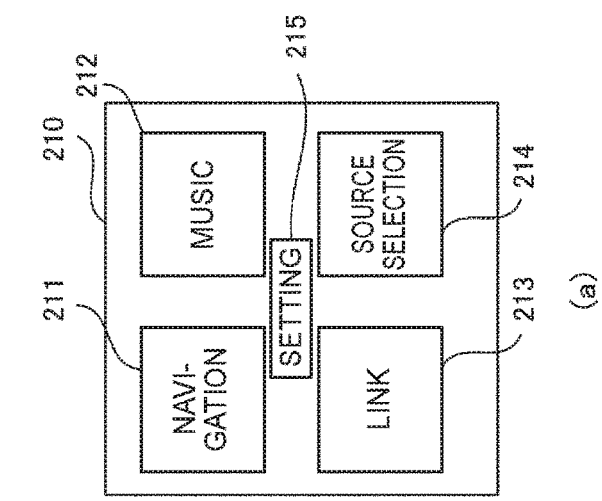
(a)
(c)

AUDIO DEVICE, AUDIO SYSTEM

TECHNICAL FIELD

The present invention relates to an audio device, and an audio system.

BACKGROUND ART

A configuration in which a portable terminal and another terminal are connected, and a sounds signal and a video signal, which are output with an application executed by the portable terminal, are output from the other terminal, is well known. PTL 1 discloses a configuration of storing priority information indicating the priority of sound output for each external application that is installed, and outputting sound, based on an application having higher priority, from a sound output means equipped in a vehicle.

CITATION LIST

Patent Literature

[PTL 1] Japanese Unexamined Patent Application Publication No. 2014-38188

SUMMARY OF THE INVENTION

Problems to be Solved by the Invention

When the sound output of the invention of PTL 1 is replaced with a video output, even if the applications are prioritized in advance, it is not possible to display a screen using the screen information stored in the device, into which the video signal was input, based on the selection of the application.

Means to Solve the Problems

According to the first mode of the present invention, provided is an audio device which is connectable to a portable terminal, comprising: a display unit which displays information; a screen information storage unit which stores screen information of a predetermined application; an acceptance unit which accepts a selection of an application; a selection information storage unit which stores selection information of the application accepted by the acceptance unit; an audio device communication unit which sends the application selection information to the portable terminal and receives information according to the application selection information; and a screen display control unit which, upon receiving information according to the application selection information from the audio device communication unit, displays on the display unit a screen using the screen information stored in the screen information storage unit based on the application selection information stored in the selection information storage unit.

According to the second mode of the present invention, provided is an audio system including a portable terminal, and an audio device, wherein the audio device comprises: a display unit which displays information; a screen information storage unit which stores screen information of a predetermined application; an acceptance unit which accepts a selection of an application; a selection information storage unit which stores selection information of the application accepted by the acceptance unit; an audio device communication unit which sends the application selection information to the portable terminal and receives information according to the application selection information; and a screen display control unit which, upon receiving information according to the application selection information from the audio device communication unit, displays on the display unit a screen using the screen information stored in the screen information storage unit based on the application selection information stored in the selection information storage unit, and wherein the portable terminal comprises: a portable terminal storage unit which stores the predetermined application; a portable terminal communication unit which communicates with the audio device and receives the application selection information from the audio device, and sends information including screen information according to the application selection information; and a network communication unit which acquires information corresponding to the predetermined application from a network by using the application selection information received by the portable terminal communication unit.

Advantageous Effects of the Invention

According to the present invention, when a video signal has been input from the outside, it is possible to display a screen using the screen information stored in the screen information storage unit based on the selection information of the application.

BRIEF DESCRIPTION OF DRAWINGS

FIG. 3(a) is a diagram showing a home screen, FIG. 3(b) is a diagram showing a music selection screen, FIG. 3(c) is a diagram showing a dynamic link screen, and FIG. 3(d) is a diagram showing a source selection screen.

DESCRIPTION OF EMBODIMENTS

Embodiments

Figure 1:
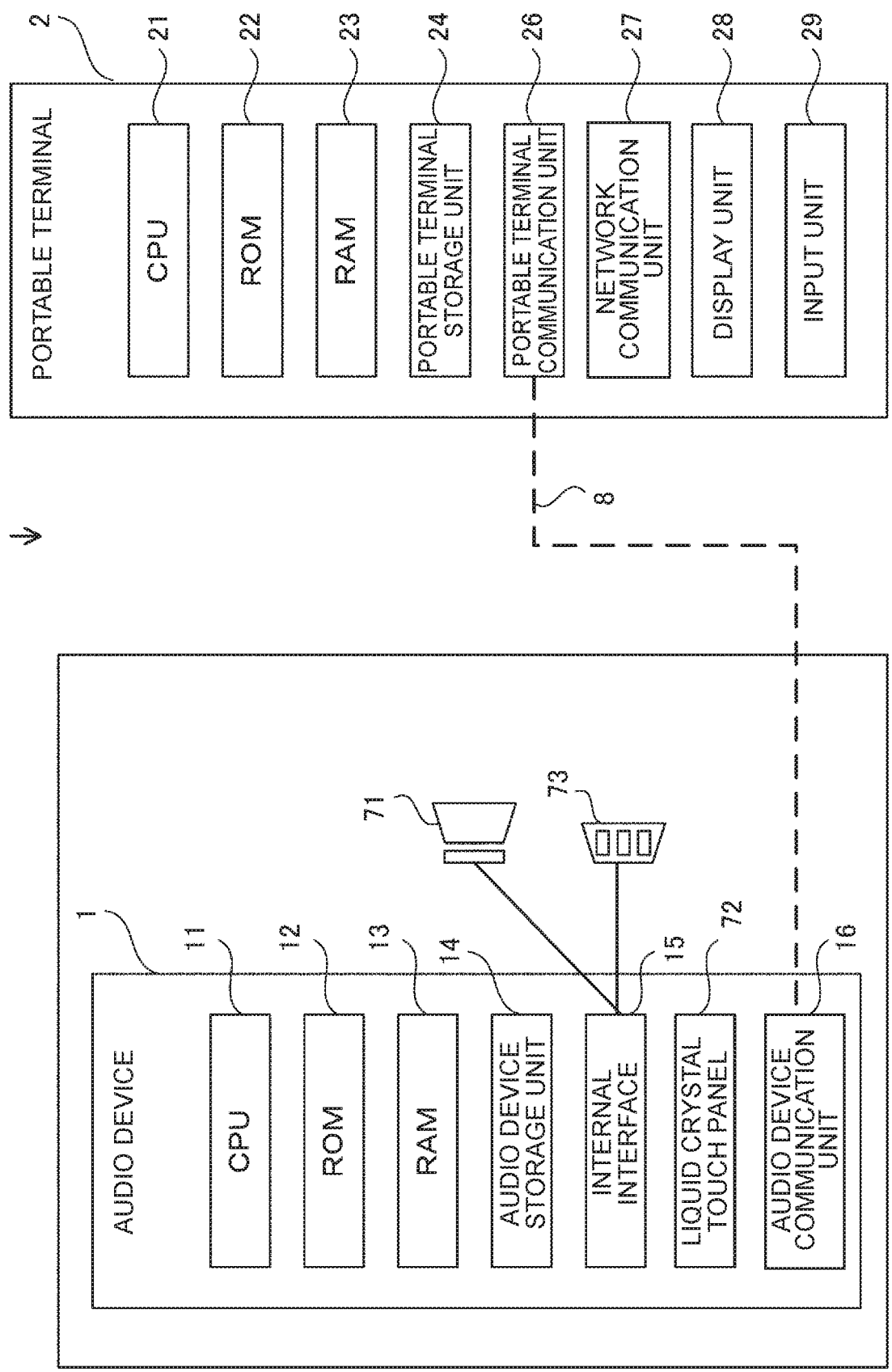
FIG. 1 is a diagram showing a hardware configuration of the audio device and the portable terminal.

FIG. 1 is a diagram showing the hardware configuration of an audio system 9 including an audio device 1 according to one embodiment of the present invention. The audio system 9 shown in FIG. 1 is used by being installed in a vehicle. The audio system 9 is realized by the audio device 1 and a portable terminal 2 being mutually connected through wired communication via a communication cable 8. The audio device 1 is fixed within a vehicle, and, for instance, is installed within the instrument panel of the vehicle. The portable terminal 2 is a portable-type information terminal that can be carried by a user, and, for instance, is a portable phone, a smartphone, or a tablet terminal. Note that the wired communication via the communication cable 8 may be performed, for instance, by using HDMI (registered trademark).

The vehicle comprises the audio device 1, a speaker 71, and a steering controller 73. The speaker 71 and the steering controller 73 are connected to the audio device 1 via a signal line.

The speaker 71 outputs sound based on the signals output from the audio device 1. The steering controller 73 is a plurality of buttons provided on the steering wheel of the vehicle. When one of the buttons is pressed, an operating command, in the same manner as touching the corresponding icon (described later) displayed on the liquid crystal touch panel 72, is output to the audio device 1.

The audio device 1 comprises a CPU 11, a ROM 12, a RAM 13, an audio device storage unit 14, an internal interface 15, an audio device communication unit 16 which communicates with the portable terminal 2, and a liquid crystal touch panel 72. The CPU 11 executes the various functions described later by reading the programs stored in the ROM 12 into the RAM 13 and executing such programs. Moreover, the CPU 11 similarly executes a plurality of audio device application programs (hereinafter referred to as the "audio device applications") stored in the audio device storage unit 14. The RAM 13 stores a source variable and a flag described later. A source variable is set to various values based on the user's input operation, and a flag is turned ON or OFF based on the programs described later.

The liquid crystal touch panel 72 is configured by combining a liquid crystal display capable of displaying various images and videos, and a touch sensor which detects the touched position. The user can output the intended operating command to an internal interface 15 described later by touching an arbitrary position on the liquid crystal touch panel 72 with one's finger according to the content of the image or video displayed on the liquid crystal touch panel 72. The liquid crystal touch panel 72 may additionally comprise one or more buttons.

The audio device storage unit 14 is a non-volatile data storage device, and, for instance, is realized with an HDD (hard disk drive) or a flash memory. The data stored in the audio device storage unit 14 will be described later. The internal interface 15 is an interface that is connected to the speaker 71, the liquid crystal touch panel 72, and the steering controller 73. The audio device communication unit 16 sends and receives various types of information to and from the audio device 1 by being connected to a portable terminal communication unit 26 of the portable terminal 2 via a communication cable 8.

The portable terminal 2 comprises a CPU 21, a ROM 22, a RAM 23, a portable terminal storage unit 24, a portable terminal communication unit 26 which communicates with the audio device 1, a network communication unit 27 which communicates with an external network, a display unit 28, and an input unit 29.

The display unit 28 and the input unit 29 are a touch panel-type display monitor capable of displaying various images and videos, and, for example, are configured by combining a touch sensor, which detects the touched position, and a liquid crystal display. The user can cause the portable terminal 2 to execute the intended function by touching an arbitrary position on the display unit 28 with one's finger according to the content of the image or video displayed on the display unit 28.

The portable terminal storage unit 24 is a non-volatile data storage device, and, for instance, is realized with an HDD or a flash memory. The portable terminal storage unit 24 stores a plurality of portable terminal application programs (hereinafter referred to as the "portable applications"), and a plurality of song data. While the portable application can be freely added by a user, in this embodiment, the portable applications stored in the portable terminal storage unit 24 are a call application for making phone calls, an email application for sending and receiving emails, a contact notebook application for displaying and editing the user's personal contact information, a music application for playing song data, and an internet radio application for listening to internet radio. Among the five portable applications described above, sound output is performed in the three applications of call application, music application, and internet radio application. The portable applications are read into the RAM 23 and executed by the CPU 21 based on an operating command from the display unit 28, or based on an operating command from the audio device 1.

The portable terminal communication unit 26 sends and receives various types of information to and from the audio device 1 by being connected to the audio device communication unit 16 of the audio device 1 via the communication cable 8. The network communication unit 27 is a wireless communication module. The portable terminal 2 is connected to a mobile phone network via the network communication unit 27, and accesses a plurality of servers connected to a wide area network such as the internet. The portable terminal 2 subsequently sends and receives information corresponding to the portable application to be executed. For example, the portable terminal 2 sends and receives email information when the email application is being executed, sends selection information of internet radio stations described later when the internet radio application is being executed, and receives information such as song data, song name, and album artwork when the music application is being executed.

(Internet Radio Application)

Internet radio, unlike AM/FM radio which uses modulated radio waves as carrier waves, receives and reproduces sound data through data communication via the internet. A plurality of internet radio broadcast stations exist around the world, and the user can listen to one's arbitrary internet radio by designating the URI (Uniform Resource Identifier).

The internet radio application is one of the portable applications, and is executed by the CPU 21 of the portable terminal 2. URI of a plurality of internet radio stations are preset in the Internet radio application. However, the user may also add an Internet radio station by inputting a URI. The internet radio application changes the internet radio station from which data is to be received based on the user's selection. Furthermore, the internet radio application has a function of collecting song evaluation from the user.

(Functional Blocks)

Figure 2:
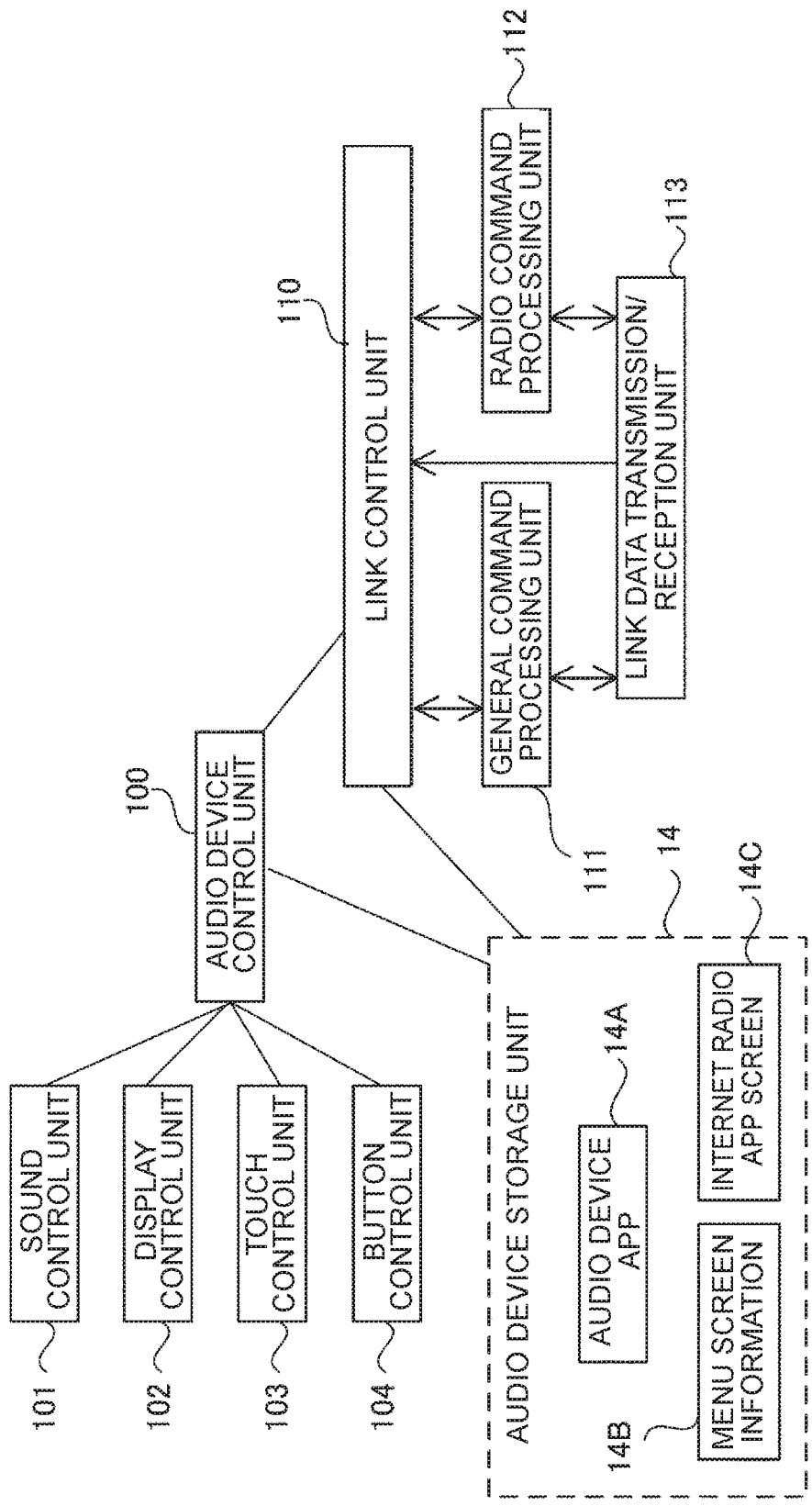
FIG. 2 is a functional block diagram of the audio device.

FIG. 2 is a functional block diagram which shows, as functional blocks, the functions that are realized by the CPU 11 of the audio device 1 executing the programs stored in the ROM 12. As shown in FIG. 2, the audio device 1 comprises, as its logical configuration, an audio device control unit 100, a sound control unit 101, a display control unit 102, a touch control unit 103, a button control unit 104, a link control unit 110, a general command processing unit 111, a radio command processing unit 112, and a link data transmission/reception unit 113. Note that, while FIG. 2 also shows the audio device storage unit 14, it is indicated with a broken line because it is not a functional block. The audio device control unit 100 is connected to the sound control unit 101, the display control unit 102, the touch control unit 103, the button control unit 104, the link control unit 110, and the audio device storage unit 14 via a virtual signal line. The link control unit 110 is connected to the general command processing unit 111, the radio command processing unit 112, the link data transmission/reception unit 113, and the audio device storage unit 14 via a virtual signal line. The link data transmission/reception unit 113 is connected to the general command processing unit 111, and the radio command processing unit 112 via a virtual signal line.

The audio device storage unit 14 stores a plurality of audio device applications 14A, menu screen information 14B, and internet radio application screen information 14C. The audio device applications 14A are, for example, a navigation application for guiding the user to the set destination, a CD play application for playing music CDs, and an AM/FM radio application for playing so-called terrestrial radio. The menu screen information 14B is information of a plurality of menu screens to be displayed on the display control unit 102, and transition information of such menu screens. The Internet radio application screen information 14C is information for generating a screen that corresponds to the internet radio application. Specific examples of the menu screen and the internet radio application screen will be explained later.

The audio device control unit 100 governs the control of the audio device 1. The audio device control unit 100 performs transition of the menu screen, activation of the audio device application, control of the audio device application, setting of the source variable, and link operation with the portable terminal based on the user's operations input from the touch control unit 103 and the button control unit 104. The audio device control unit 100 outputs an operating command to the sound control unit 101 and the display control unit 102. The sound signal sent by the audio device control unit 100 to the sound control unit 101 is the sound signal generated by the audio device control unit 100, or the sound signal generated by the portable terminal 2 and received via the link control unit 110. The video signal sent by the audio device control unit 100 to the display control unit 102 is the video signal generated by the audio device control unit 100, the video signal generated by the link control unit 110, or the video signal generated by the portable terminal 2 and received via the link control unit 110. When the audio device control unit 100 receives an input from the touch control unit 103 or the button control unit 104, the audio device control unit 100 determines whether the received input relates to a dynamic link described later, and, when the received input related to a dynamic link, sends the received input to the link control unit 110. The audio device control unit 100 outputs a value of a new source variable to the link control unit 110 each time a source variable is set.

The sound control unit 101 operates the speaker 71 based on an operating command of the audio device control unit 100. The display control unit 102 displays a video on the liquid crystal touch panel 72 based on an operating command of the audio device control unit 100. The touch control unit 103 sends the user's operation input, which was input to the liquid crystal touch panel 72, to the audio device control unit 100. The button control unit 104 sends the user's operation input, which was input to the steering controller 73, to the audio device control unit 100.

The link control unit 110 processes the input information related to the dynamic link which was input from the audio device control unit 100, and outputs a video signal and a sound signal to the audio device control unit 100. When the link control unit 110 receives an input of the input information related to the dynamic link from the audio device control unit 100, the link control unit 110 sends the input information to the general command processing unit 111 or the radio command processing unit 112. The link control unit 110 sends the information input to the radio command processing unit 112 when a screen of the internet radio application is displayed on the liquid crystal touch panel 72 and there is an input from the liquid crystal touch panel 72, but sends the information input to the general command processing unit 111 in all other cases. When the link control unit 110 receives a video signal and a sound signal from the link data transmission/reception unit 113, the link control unit 110 outputs the received sound signal to the audio device control unit 100. Here, the link control unit 110 outputs the received video signal, together with the sound signal, to the audio device control unit 100 when a predetermined condition described later is not satisfied, and creates a video signal that is different from the received video signal and outputs the created video signal, together with the sound signal, to the audio device control unit 100 when a predetermined condition described later is satisfied.

The general command processing unit 111 handles commands other than those related to the internet radio application of the portable terminal 2. The general command processing unit 111 has a command generation function, and a command interpretation function. The general command processing unit 111 generates a command, such as an activation instruction command of the portable application, based on the input information which was input from the link control unit 110, and sends the generated command to the portable terminal 2 via the link data transmission/reception unit 113. The general command processing unit 111 interprets a command, such as information related to the link processing described later, which is input from the link data transmission/reception unit 113, and outputs the interpreted command to the link control unit 110.

The radio command processing unit 112 handles commands related to the internet radio application of the portable terminal 2. The radio command processing unit 112 has a command generation function, and a command interpretation function. The radio command processing unit 112 generates a command, such as an activation instruction command of the internet radio application, based on the input information which was input from the link control unit 110, and sends the generated command to the portable terminal 2 via the link data transmission/reception unit 113. The radio command processing unit 112 interprets the command input from the link data transmission/reception unit 113, such as information of the name of the selected Internet radio station, name of the song now playing, and album artwork of the song now playing, and outputs the interpreted command to the link control unit 110.

The link data transmission/reception unit 113 receives a video signal and a sound signal from the portable terminal 2, and outputs the receiving video signal and sound signal to the link control unit 110. The link data transmission/reception unit 113 sends, to the portable terminal 2, the commands that are input from the general command processing unit 111 and the radio command processing unit 112. When the link data transmission/reception unit 113 receives a command from the portable terminal 2, the link data transmission/reception unit 113 determines whether the command is a general command or a radio command. Subsequently, the link data transmission/reception unit 113 sends the received command to the general command processing unit 111 upon determining that it is a general command, and sends the received command to the radio command processing unit 112 upon determining that it is a radio command.

(Menu Screen)

The transition of the menu screen displayed on the liquid crystal touch panel 72 is now explained with reference to FIG. 3(*a*) to FIG. 3(*d*). FIG. 3(*a*) is a diagram showing a home screen 210, FIG. 3(*b*) is a diagram showing a music selection screen 220, FIG. 3(*c*) is a diagram showing a dynamic link screen 230, and FIG. 3(*d*) is a diagram showing a source selection screen 240. FIG. 3(*a*), FIG. 3(*b*), and FIG. 3(*d*) are screens generated by the audio device control unit 100 based on the menu screen information 14B, and FIG. 3(*c*) is a screen generated based on the video signal received from the portable terminal 2. Note that, in FIG. 3, while the illustrated text is shown in the form of an icon, the icon may also be configured from a text and an image, or the icon may be configured only from an image.

FIG. 3(*a*) is a diagram showing the home screen 210 which is displayed on the liquid crystal touch panel 72 by the audio device control unit 100 when the audio device 1 is activated. The home screen 210 displays a navigation icon 211 for activating the navigation application, a music icon 212 for switching to the music selection screen 220, a link icon 213 for switching to the dynamic link screen 230, a source selection icon 214 for switching to the source selection screen 240, and a setting icon 215 for switching to the setting screen used for performing various settings of the audio device control unit 100. However, the home screen 210 shown in FIG. 3(*a*) is merely an example, and other icons may be additionally displayed.

FIG. 3(*b*) is a diagram showing the music selection screen 220 which is displayed on the liquid crystal touch panel 72 when the music icon 212 is selected on the home screen 210. Displayed on the music selection screen 220 are a CD icon 221 for activating the CD play application, a terrestrial radio icon 222 for activating the AM/FM radio application, an internet radio icon 223 for activating the internet radio application, and a music application icon 224 for activating the music application. Note that the internet radio icon 223 and the music application icon 224 are displayed irrespective of whether or not the internet radio application and the music application are stored in the portable terminal storage unit 24 of the portable terminal 2.

FIG. 3(*c*) is a diagram showing the dynamic link screen 230 which is displayed on the liquid crystal touch panel 72 when the link icon 213 is selected on the home screen 210. As described above, the dynamic link screen 230 is generated by the portable terminal 2, and sent to the audio device 1 via the communication cable 8. Displayed on the dynamic link screen 230 are a phone icon 231 for activating the call application, an email icon 232 for activating the email application which sends and receives emails, a phone book icon 234 for activating the contact notebook application, and the music application icon 224. However, the internet radio icon 223 may also be displayed on the dynamic link screen 230. Moreover, when another portable application is installed in the portable terminal 2, that portable application is additionally displayed on the dynamic link screen 230.

FIG. 3(*d*) is a diagram showing the source selection screen 240 which is displayed on the liquid crystal touch panel 72 when the source selection icon 214 is selected on the home screen 210. Displayed on the source selection screen 240 are the CD icon 221, the terrestrial radio icon 222, the link icon 213, and the internet radio icon 223.

(Screen of Respective Applications)

Figure 4:
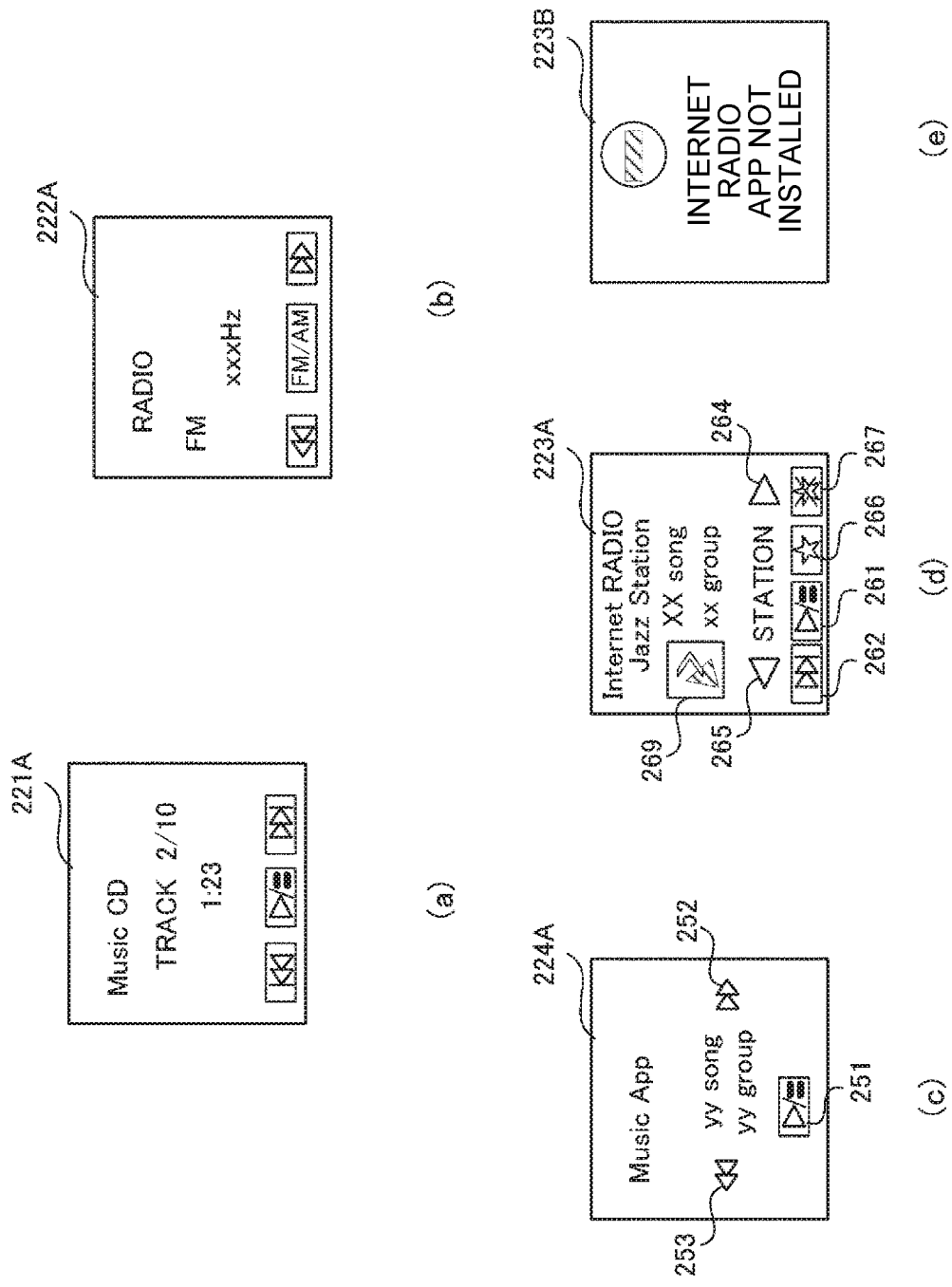
FIG. 4(a) is a diagram showing an execution screen of a CD play application.
FIG. 4(b) is a diagram showing an execution screen of an AM/FM radio application.
FIG. 4(c) is a diagram showing an execution screen of a music application.
FIG. 4(d) is a diagram showing an execution screen of an internet radio application.
FIG. 4(e) is a diagram showing an error display screen of an internet radio application.

The display screen of the respective applications displayed on the liquid crystal touch panel 72 are now explained with reference to FIG. 4(*a*) to FIG. 4(*e*). FIG. 4(*a*) to FIG. 4(*d*) are each an execution screen of the CD play application, the AM/FM radio application, the music application, and the internet radio application. FIG. 4(*e*) is an error display screen of the internet radio application. Note that, in the ensuing explanation, while a case is explained where the display screen of the application is displayed when one of the icons displayed on the liquid crystal touch panel 72 is selected, there are also cases where, when a button of the steering controller 73 is pressed, the display screen of the application corresponding to that button is displayed.

FIG. 4(*a*) is a diagram showing a music CD play screen 221A which is displayed when the CD icon 221 is selected. The music CD play screen 221A displays the total number of tracks of the inserted music CD, the track number of the track number being played, play time of the track being played, and play control buttons. The play control buttons are a play/pause button, a forward skip button for playing the next track, and a reverse skip button for playing the preceding track.

FIG. 4(*b*) is a diagram showing a terrestrial radio play screen 222A which is displayed when the terrestrial radio icon 222 is selected. Displayed on the terrestrial radio play screen 222A are the modulation and frequency that are currently selected, and play control buttons. The play control buttons are a button for switching the modulation and a button for changing the frequency.

The CD play application shown in FIG. 4(*a*) and the AM/FM radio application shown in FIG. 4(*b*) are audio device applications, and is executed by the audio device control unit 100 of the audio device 1; that is, by the CPU 11. The foregoing music CD play screen 221A and the terrestrial radio play screen 222A are generated by the audio device control unit 100 and output to the liquid crystal touch panel 72.

FIG. 4(*c*) is a diagram showing a music application screen 224A which is displayed when the music application icon 224 is selected. Displayed on the music application screen 224A are the name of the song now playing, the name of the artist of the song now playing, play time of the song now playing, and play control buttons. The play control buttons are a play/pause button 251, a forward skip button 252 for playing the next track, and a reverse skip button 253 for playing the preceding track.

The music application is executed in the portable terminal 2. The portable terminal 2 outputs, to the audio device 1 via the communication cable 8, audio information, video information, and information regarding the song now playing output by the music application. The audio device 1 outputs the received audio information from the speaker 71 via the sound control unit 101, and outputs the received video information from the liquid crystal touch panel 72 via the display control unit 102.

FIG. 4(*d*) is a diagram showing an internet radio application screen 223A which is displayed when the internet radio icon 223 is selected. Displayed on the internet radio application screen 223A are the name of the selected internet radio broadcast station, the name of the song now playing, the name of the artist of the song now playing, an album artwork 269 of the song now playing, and control buttons. The control buttons are a play/pause button 261, a forward skip button 262 for playing the next song, a station forward skip button 264 for forwarding the internet radio broadcast station to the next station, a station reverse skip button 265 for reversing the internet radio broadcast station to the preceding station, a positive evaluation button 266 for performing a positive evaluation of the song now playing, and a negative evaluation button 267 for performing a negative evaluation of the song now playing.

Upon comparing FIG. 4(c) and FIG. 4(d), they are the same with respect to the point that the name of the song now playing and the name of the artist of the song now playing are displayed, and certain control buttons are also the same. In other words, the play/pause button 251 and the forward skip button 252 in FIG. 4(c) respectively correspond to the play/pause button 261 and the forward skip button 262 in FIG. 4(d). Nevertheless, images corresponding to the station forward skip button 264, the station reverse skip button 265, the positive evaluation button 266, the negative evaluation button 267, and the album artwork 269 in FIG. 4(d) do not exist in FIG. 4(c). Accordingly, the internet radio application screen 223A includes information that does not exist on the music application screen 224A, and, not only is more information displayed, operations that are not possible on the music application screen 224A, such as positive evaluation, can also be performed.

FIG. 4(e) is a diagram showing an error display screen 223B which is displayed under predetermined conditions described later when the internet radio icon 223 is selected. The error display screen 223B displays a message to the effect that an internet radio application is not installed in the portable terminal 2.

The internet radio application is executed in the portable terminal 2. The portable terminal 2 outputs, to the audio device 1 via the communication cable 8, audio information, video signal representing the music application screen 224A, and information related to the song now playing which are output by the internet radio application. The audio device 1 creates the internet radio application screen 223A by using the received information related to the song now playing and the screen information stored in the storage unit, and outputs the created internet radio application screen 223A to the liquid crystal touch panel 72 via the display control unit 102. The audio device 1 outputs the received audio information from the speaker 71 via the sound control unit 101.

(Switching of Screen Output and Sound Output)

The transition of screens explained with reference to FIG. 3 and the transition to the application execution screen explained with reference to FIG. 4 were based on the selection of one of the icons displayed on the liquid crystal touch panel 72. When a button corresponding to the icon equipped in the steering controller 73 is pressed, whether to perform the screen display of the selected application is determined based on the type of information that is currently displayed on the liquid crystal touch panel 72. In other words, the screen display of the selected application is not performed when an audio device application such as the navigation application that is not intended for playing music, or the setting screen called from the setting icon 215 is displayed, and the screen display of the selected application is performed when any other screen display is being performed. To put it differently, the screen display of the selected application is performed when the liquid crystal touch panel 72 is displaying an audio device application intended for playing music, the home screen 210, the music selection screen 220, the dynamic link screen 230, the source selection screen 240, or a portable terminal application such as the internet music application or the music application.

However, all information that is displayed as a result of the link icon 213, the internet radio icon 223, or the music application icon 224 being selected is information that is received from the portable terminal 2 via the link control unit 110. Thus, when the foregoing icons are selected, the video information output from the link control unit 110 is displayed on the liquid crystal touch panel 72.

Meanwhile, with regard to the sound output, sound of the selected application is output irrespective of the screen display of the liquid crystal touch panel 72, and irrespective of whether the application was selected using the liquid crystal touch panel 72 or the steering controller 73.

(Source Variable)

The audio device control unit 100 sets the source variable based on the input from the touch control unit 103 and the button control unit 104. The source variable may take on a value corresponding to the respective audio device applications, or a value corresponding to the internet radio application. Specifically, the source variable may take on the following four values; specifically, a value corresponding to the navigation application, a value corresponding to the CD play application, a value corresponding to the AM/FM radio application, and a value corresponding to the internet radio application. When one of the audio device applications or the internet radio application is selected, the audio device control unit 100 sets a value corresponding to the selected application as the source variable. Because the value is overwritten each time the source variable is set, only the latest selection is reflected.

(Dynamic Link)

The dynamic link of the audio device 1 and the portable terminal 2 is now explained. By using this dynamic link, when various portable applications pre-installed in the portable terminal 2 are executed in a state where the audio device 1 and the portable terminal 2 are mutually connected, an image display and a sound output according to the portable application can be performed in the audio device 1. Moreover, contents of the user's operation performed to the audio device 1 can be reflected in the operation of the application being executed in the portable terminal 2. As examples of an application using this kind of dynamic link, there are, for instance, the email application, the music application, and the internet radio application.

The portable terminal 2 determines the screen display to be output to the audio device 1 according to the type of application that is being executed. For example, because the music application and the internet radio application are both applications that play music, a video signal representing the music application screen 224A is output when either of these applications is being executed. However, as the sound signal, the sound signal that is output from the application being executed is output as is.

Moreover, as described above, the audio device 1 is pre-equipped with an audio device application that can be independently executed by the audio device 1 without using the foregoing dynamic link. As a result of the audio device 1 executing this audio device application, it is also possible to perform various types of image display and sound output according to the audio device application in the audio device 1. As an example of an application that does not use the foregoing dynamic link, there is, for instance, the navigation application.

(Flowchart)

As described above, the link control unit 110 determines, depending on whether or not a predetermined condition is satisfied, whether to output the video signal received from the link data transmission/reception unit 113 to the audio device control unit 100, or output its independently created video to the audio device control unit 100. In this embodiment, whether or not a condition is satisfied is determined based on the existence or nonexistence of a flag as explained below. The flag is stored in the RAM 13.

Figure 5:
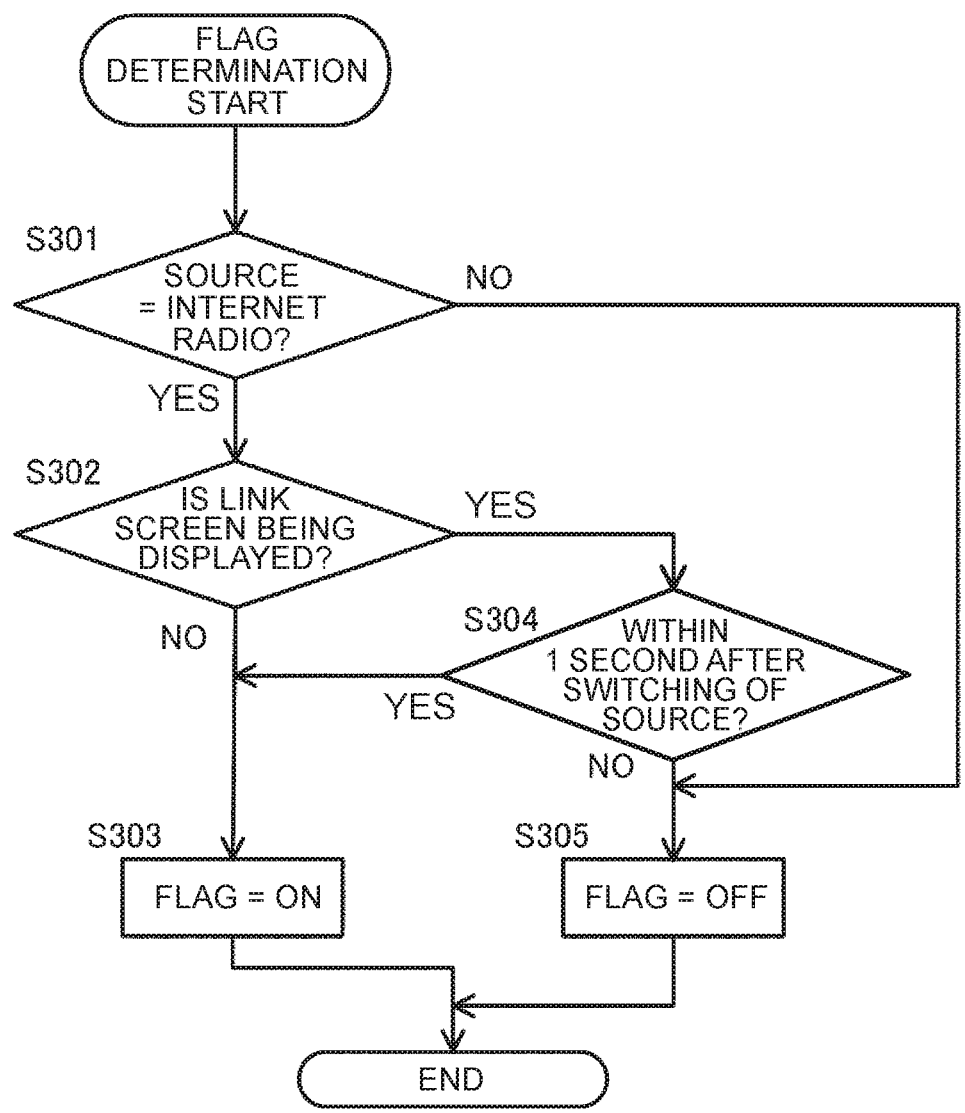
FIG. 5 is a flowchart showing the flag determination processing to be executed by the audio device.

FIG. 5 is a flowchart showing the flag determination processing to be performed by the link control unit 110. The executing agent of the respective steps explained below is the link control unit 110. The processing of step S301 is started based on an execution command from a separated flowchart described later.

In step S301, the link control unit 110 determines whether the source variable is a value corresponding to internet radio. The link control unit 110 proceeds to step S302 upon determining that the source variable is a value corresponding to internet radio, and proceeds to step S305 upon determining that the source variable is not a value corresponding to internet radio.

In step S302, the link control unit 110 determines whether the link screen 230 is displayed on the liquid crystal touch panel 72. The link control unit 110 proceeds to step S304 upon determining that the link screen 230 is being displayed, and proceeds to step S303 upon determining that a screen other than the link screen 230 is being displayed.

In step S303, the link control unit 110 turns ON the flag and stores the flag in the RAM 13, and then ends the flowchart of FIG. 5.

In step S304, the link control unit 110 determines whether it is within 1 second after source switching. The link control unit 110 proceeds to step S303 upon determining that it is within 1 second after source switching, and proceeds to step S305 upon determining that a longer time has elapsed than 1 second after source switching. Note that, to obtain a positive determination in this step means that, for instance, a button corresponding to the internet radio icon 223 has been pressed on the steering controller 73 in a state where the link screen 230 is being displayed on the liquid crystal touch panel 72. To obtain a negative determination in this step means that, in a state where the source selection screen 240 is being displayed, the internet radio icon 223 and the link icon 213 are consecutively pressed, the dynamic link screen 230 is displayed, and a video signal and a sound signal are received after the lapse of a longer time than 1 second after the internet radio icon 223 was pressed.

In step S305, the link control unit 110 turns OFF the flag and stores the flag in the RAM 13, and then ends the flowchart of FIG. 5.

The link control unit 110 manages the flag based on the processing described above.

Figure 6:
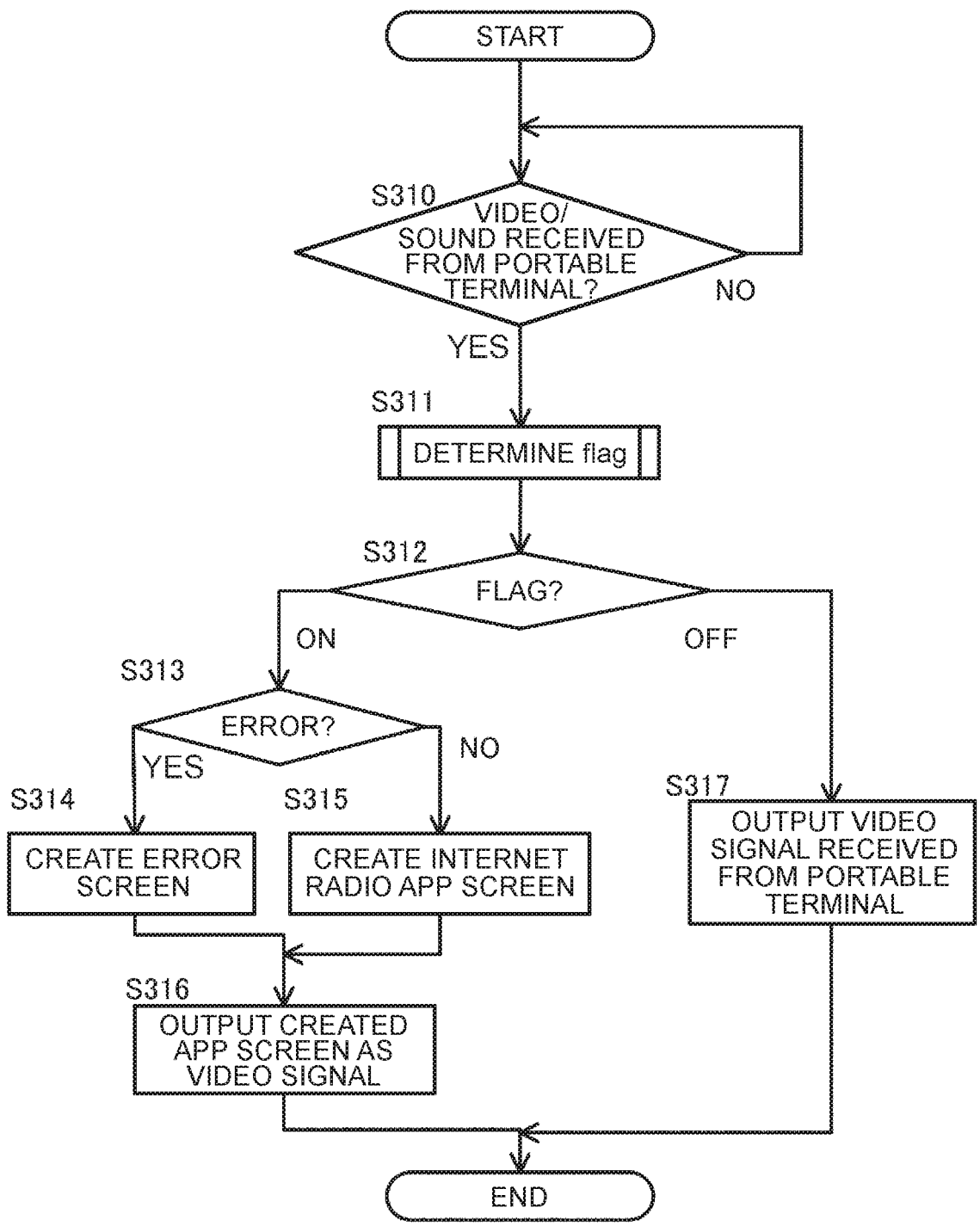
FIG. 6 is a flowchart showing the video creation determination processing to be executed by the audio device.

FIG. 6 is a flowchart showing the processing of determining the video signal to be so output to the audio device control unit 100 by the link control unit 110. The executing agent of the respective steps explained below is the link control unit 110.

In step S310, the link control unit 110 determines whether a video signal and a sound signal were received from the portable terminal 2. The link control unit 110 proceeds to step S311 upon determining that a video signal and a sound signal were received, and remains at step S310 upon determining that a video signal and a sound signal were not received.

In step S311, the link control unit 110 performs the flag determination processing shown in FIG. 5, and then proceeds to step S112.

In step S312, the link control unit 110 determines the status of the flag determined in step S311, and proceeds to step S313 upon determining that the flag is ON, and proceeds to step S317 upon determining that the flag is OFF.

In step S313, the link control unit 110 determines whether the information interpreted by the radio command processing unit 112 includes an error to the effect that the designated application does not exist in the portable terminal 2. The link control unit 110 proceeds to step S314 upon determining that the error is included, and proceeds to step S315 upon determining that the error is not included.

In step S314, the link control unit 110 uses the internet radio application screen information 14C to generate the error display screen 223B shown in FIG. 4(*e*), and then proceeds to step S316.

In step S315, the link control unit 110 generates the internet radio application screen 223A based on the internet radio application screen information 14C, and the information interpreted by the radio command processing unit 112. Information interpreted by the radio command processing unit 112 is, for example, name of the selected internet radio station, name of the song now playing, and information of the album artwork of the song now playing. The link control unit 110 subsequently proceeds to step S316.

In step S316, the link control unit 110 outputs, to the audio device control unit 100, the screen of the internet radio application created in step S314 or step S315 as the video signal, and then ends the flowchart of FIG. 6.

In step S317 which is executed when it is determined in step 3312 that the flag is OFF, the link control unit 110 outputs the video signal received from the portable terminal 2 to the audio device control unit 100, and then ends the flowchart of FIG. 6.

Figure 7:
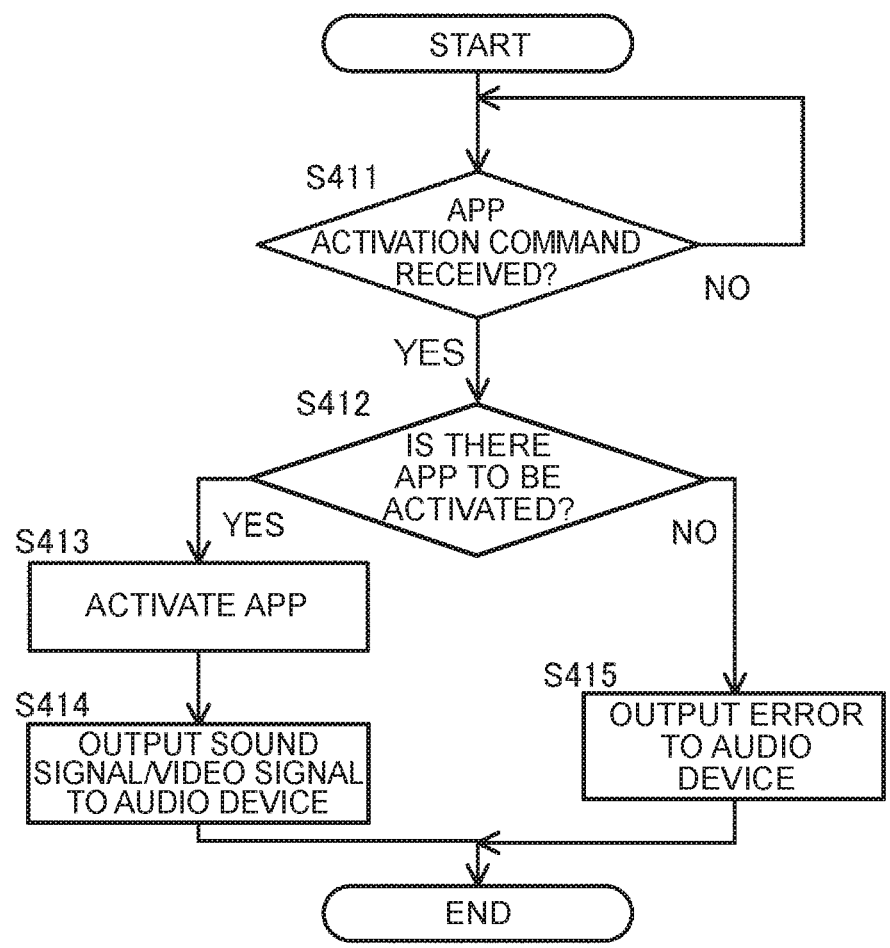
FIG. 7 is a flowchart showing the processing to be executed by the portable terminal in response to an application activation command.

FIG. 7 is a flowchart representing the processing related to the link operation of the portable terminal 2. In the ensuing explanation, the executing agent of the respective steps is the CPU 21 of the portable terminal 2.

In step S411, the CPU 21 of the portable terminal 2 determines whether an application activation command from the audio device 1 has been received. The CPU 21 proceeds to step S412 upon determining that the application activation command has been received, and remains at step S411 upon determining that the application activation command has not been received.

In step S412, the CPU 21 determines whether the application subject to the activation command is stored in the portable terminal storage unit 24. The CPU 21 proceeds to step S413 upon determining that the application is stored, and proceeds to step S415 upon determining that the application is not stored.

The CPU 21 activates the application in step S413, outputs a sound signal and a video signal to the audio device 1 in subsequent step S414, and then ends the flowchart of FIG. 7.

In step S415, the CPU 21 outputs, to the audio device 1, an error to the effect that the designated application does not exist in the portable terminal 2, and then ends the flowchart of FIG. 7.

According to the first embodiment described above, the following effects are yielded.

(1) An audio device 1 is connectable to a portable terminal 2. The audio device 1 comprises a display unit (liquid crystal touch panel 72) which displays information, a screen information storage unit which stores screen information of a predetermined application (audio device storage unit 14 which stores internet radio application screen information 14C), an acceptance unit which accepts a selection of an application (liquid crystal touch panel 72 and internal interface 15), a selection information storage unit which stores selection information of the application accepted by the acceptance unit (RAM 13 which stores a source variable), an audio device communication unit 16 which sends the application selection information to the portable terminal and receives information according to the application selection information, and a screen display control unit which, upon receiving information according to the application selection information (audio information and video information obtained by executing the internet radio application) from the audio device communication unit 16, displays on the display unit a screen using the screen information stored in the screen information storage unit based on the application selection information stored in the selection information storage unit (flag stored in the RAM 13) (link control unit 110 and display control unit 102 which uses internet radio application screen information 14C and display an internet radio application screen 223A on the liquid crystal touch panel 72). Thus, it is possible to display a screen on the display unit by using the screen information stored in the screen information storage unit based on the application selection information. To put it differently, when a specific application has been selected, a screen based on the information stored in the audio device 1 is displayed rather than a screen based on the video signal received from the portable terminal 2.

(2) When the application selection accepted by the acceptance unit is not the predetermined application (internet radio application), the screen display control unit displays a screen using the information included in the information according to the selection information received via the audio device communication unit 16 (video signal received from the portable terminal 2). Thus, for any application other the internet radio application executed in the portable terminal 2, a video signal output by the portable terminal 2 can be displayed on the liquid crystal touch panel 72.

(3) The audio device 1 displays an error on the display unit upon receiving information from the portable terminal 2, via the audio device communication unit 16, indicating that the predetermined application does not exist in the portable terminal. In other words, when an error is received from the portable terminal 2 to the effect that the designated application does not exist in the portable terminal 2, a positive determination is made in step S313 of FIG. 6, an error screen is created in step S314, and the created error screen is output to the audio device control unit 100. Subsequently, the audio device control unit 100 outputs the input video signal to the liquid crystal touch panel 72 via the display control unit 102. Thus, it is possible to notify the user that the internet radio application is not installed in the portable terminal 2.

(4) An audio system 9 includes a portable terminal 2, and an audio device 1. The portable terminal 2 comprises a portable terminal storage unit 24 which stores an application, a portable terminal communication unit 26 which communicates with the audio device 1 and receives the application selection information from the audio device 1, and sends information including screen information according to the application selection information, and a network communication unit 27 which acquires information corresponding to the predetermined application from a network (information of the song of the internet radio corresponding to the internet radio application) by using the application selection information received by the portable terminal communication unit 26. As a result of adopting the foregoing configuration, the portable terminal 2 can acquire, from a network, the information corresponding to the application selected in audio device 1 and send the acquired information to the audio device 1, and thereby provide such information to the user through the audio device 1.

Modified Example 1

The internet radio application screen 223A may be generated by the audio device control unit 100 in substitute for the link control unit 110. In the foregoing case, the link control unit 110, in substitute for generating the internet radio application screen 223A in step S316 of FIG. 6, outputs, to the audio device control unit 100, a screen generation command, and information required for generating a screen; that is, song title, artist's name, radio station name, and album artwork. When the audio device control unit 100 receives the screen generation command and the foregoing information from the link control unit 110, the audio device control unit 100 reads the internet radio application screen information 14C from the audio device storage unit 14. The audio device control unit 100 integrates the foregoing information with the internet radio application screen information 14C to generate the internet radio application screen, and outputs the generated internet radio application screen to the display control unit 102.

Modified Example 2

The configuration of the internet radio application screen 223A is not limited to the foregoing configuration. It would suffice so long as it is different from the music application screen 224A. Moreover, in the foregoing embodiment, while the evaluation target of the positive evaluation button 266 and the negative evaluation button 267 was the song now playing, the evaluation target may also be the selected internet radio station.

Modified Example 3

The portable terminal storage unit 24 does not need to store song data. In the foregoing case, song data is acquired from a server on the network via the network communication unit 27, and the acquired song data is reproduced with the music application.

Modified Example 4

The audio device 1 does not need to comprise the liquid crystal touch panel 72. In other words, the liquid crystal touch panel 72 may exist outside the audio device 1, and the liquid crystal touch panel 72 may be operated based on an operating command of the audio device 1.

Modified Example 5

The audio device storage unit 14 may store even more audio device applications. For example, additionally stored may be a satellite radio application for receiving and playing satellite radio, a USB memory audio play application for playing the music data stored in a USB memory, and a BT play application for playing the music data received from a device connected via Bluetooth (registered trademark). As described above, because a source variable takes on a different value for each audio device application, the number of values that can be taken on by the source variable will increase according to the number of audio device applications stored in the audio device storage unit 14.

Modified Example 6

The audio device control unit 100 may perform the same processing as a case where one of the icons displayed on the liquid crystal touch panel 72 is selected based on an operation other than the user's operation of the liquid crystal touch panel 72 and the steering controller 73. For instance, in the foregoing case, when the user inserts a music CD into a CD reading device not shown, the audio device control unit 100 performs the following processing. In other words, the audio device control unit 100 activates the CD play application and starts to play the music CD in the same manner as though the CD icon 221 was selected, and sets the source variable to a value corresponding to the CD play application.

Modified Example 7

Upon starting the output of a sound signal to the audio device 1, the portable terminal 2 may output a signal for starting the output of a sound signal (this is hereinafter referred to as the "audio start signal"), together with a sound signal, to the audio device 1, and the link control unit 110 of the audio device 1 may make a positive determination in step S310 of FIG. 6 upon receiving the audio start signal.

Each of the embodiments and modified examples described above may be respectively combined.

A part or all of the functions realized with software may also be realized with a hardware circuit or an FPGA circuit.

While various embodiments and modified examples were described above, the present invention is not limited thereto. Other modes that can be conceived within the technical scope of the present invention are also covered by the scope of the present invention.

The disclosure of the following priority application is incorporated herein by reference.

Japanese Patent Application No. 128507 of 2016 (filed on Jun. 29, 2016)

REFERENCE SIGNS LIST

1 . . . audio device
2 . . . portable terminal
9 . . . audio system
14 . . . audio device storage unit
14C . . . internet radio application screen information
15 . . . internal interface
16 . . . audio device communication unit
24 . . . portable terminal storage unit
26 . . . portable terminal communication unit
71 . . . speaker
72 . . . liquid crystal touch panel
100 . . . audio device control unit
102 . . . display control unit
110 . . . link control unit
113 . . . link data transmission/reception unit

The invention claimed is:

1. An audio device which is connectable to a portable terminal, comprising:
a display unit which displays information;
a screen information storage unit which stores screen information of a predetermined application;
an acceptance unit which accepts a selection of an application;
a selection information storage unit which stores application selection information of an application accepted by the acceptance unit;
an audio device communication unit which sends the application selection information to the portable terminal and receives returned information from the portable terminal, based on the application selection information, wherein the returned information includes screen information for the application accepted by the acceptance unit, or a message indicating the application accepted by the acceptance unit is not installed on the portable terminal;
a screen display control unit which,
when the application accepted by the acceptance unit is the predetermined application, displays on the display unit a screen for the predetermined application by using the stored screen information and the stored application selection information, and
when the application accepted by the acceptance unit is not the predetermined application, displays on the display unit a screen for the application accepted, based on the returned information received from the portable terminal.

2. The audio device according to claim 1, wherein when returned information includes the message indicating the application accepted by the acceptance unit is not installed on the portable terminal, the audio device displays an error message on the display unit.

3. The audio device according to claim 1, wherein the predetermine application is an internet radio application.

4. The audio device according to claim 3, wherein the screen for the internet radio application includes name of broadcast station, name of a song playing, name of an artist of the song, and control buttons.

5. The audio device according to claim 1, further comprising a link control unit which produces a video signal and outputs the video signal to the screen display control unit for display, when the application accepted by the acceptance unit is the predetermined application.

6. The audio device according to claim 5, wherein the link control unit outputs a video signal received from the portable terminal to the screen display control unit for display, when the application accepted by the acceptance unit is not the predetermined application.

7. An audio system comprising: a portable terminal, and an audio device,
wherein the audio device comprises:
a display unit which displays information;
a screen information storage unit which stores screen information of a predetermined application;
an acceptance unit which accepts a selection of an application;
a selection information storage unit which stores application selection information of the application accepted by the acceptance unit;
an audio device communication unit which sends the application selection information to the portable terminal and receives returned information from the portable terminal, based on the application selection information, wherein the returned information includes screen information for the application accepted by the acceptance unit, or a message indicating the application accepted by the acceptance unit is not installed on the portable terminal;
a screen display control unit which,
when the application accepted by the acceptance unit is the predetermined application, displays on the display unit a screen for the predetermined application by using the stored screen information and the stored application selection information, and
when the application accepted by the acceptance unit is not the predetermined application, displays on the display unit a screen for the application accepted, based on the returned information received from the portable terminal, and wherein the portable terminal comprises:
- a portable terminal storage unit which stores the predetermined application;
- a portable terminal communication unit which communicates with the audio device and receives the application selection information from the audio device, and sends the screen information according to the application selection information; and
- a network communication unit which acquires information corresponding to the predetermined application from a network by using the application selection information received by the portable terminal communication unit.

8. An audio device which is connectable to a portable terminal, comprising:
- a display unit which displays information;
- a screen information storage unit which stores screen information of a predetermined application;
- an acceptance unit which accepts a selection of an application;
- a selection information storage unit which stores application selection information of an application accepted by the acceptance unit;
- an audio device communication unit which sends the application selection information to the portable terminal and receives returned information from the portable terminal, based on the application selection information, wherein the returned information includes screen information for the application accepted by the acceptance unit, or a message indicating the application accepted by the acceptance unit is not installed on the portable terminal;
- a link control unit that produces a screen for the predetermined application by using the screen information stored in the screen information storage unit and the returned information, when the application accepted by the acceptance unit is the predetermined application executed while the audio device and the portable terminal are linked to each other; and
- a screen display control unit which,
  - when the application accepted by the acceptance unit is the predetermined application, displays on the display unit the screen for the predetermined application, and
  - when the application accepted by the acceptance unit is not the predetermined application, displays on the display unit a screen for the application accepted, based on the returned information received from the portable terminal.

* * * * *